US007576322B2

(12) United States Patent
Karpetsky et al.

(10) Patent No.: US 7,576,322 B2
(45) Date of Patent: Aug. 18, 2009

(54) NON-CONTACT DETECTOR SYSTEM WITH PLASMA ION SOURCE

(75) Inventors: Timothy P. Karpetsky, Towson, MD (US); John C. Berends, Jr., Bel Air, MD (US)

(73) Assignee: Science Applications International Corporation, San Diego, CA (US)

( * ) Notice: Subject to any disclaimer, the term of this patent is extended or adjusted under 35 U.S.C. 154(b) by 258 days.

(21) Appl. No.: 11/594,401

(22) Filed: Nov. 8, 2006

(65) Prior Publication Data

US 2007/0114389 A1 May 24, 2007

Related U.S. Application Data

(60) Provisional application No. 60/734,633, filed on Nov. 8, 2005.

(51) Int. Cl.
*H01J 49/00* (2006.01)
*H01J 49/10* (2006.01)
*B01D 59/44* (2006.01)

(52) U.S. Cl. ....................... 250/288; 250/283; 250/286; 250/423 R; 250/424; 250/425

(58) Field of Classification Search ................. 250/281, 250/282, 283, 286, 288, 423 R, 424, 425, 250/429, 489
See application file for complete search history.

(56) References Cited

U.S. PATENT DOCUMENTS 4,000,918 A 1/1977 Reker .......................... 285/93
4,159,423 A 6/1979 Kambara ................ 250/423 R
4,209,696 A 6/1980 Fite ............................ 250/281
4,271,357 A 6/1981 Bradshaw et al. ........... 250/287
4,300,004 A 11/1981 Wissner et al. .............. 570/211
4,318,028 A 3/1982 Perel et al. ............. 315/111.81
4,468,468 A 8/1984 Benninghoven et al. ..... 436/173
4,531,056 A 7/1985 Labowsky et al. .......... 250/288
4,542,293 A 9/1985 Fenn et al. .................. 250/288
4,546,253 A 10/1985 Tsuchiya et al. ............ 250/288
4,789,783 A 12/1988 Cook .......................... 250/379
4,855,595 A 8/1989 Blanchard .................... 250/287
4,948,962 A 8/1990 Mitsui et al. ................ 250/288
4,974,648 A 12/1990 Propst ..................... 144/24.13

(Continued)

FOREIGN PATENT DOCUMENTS

GB 2127212 4/1984

(Continued)

OTHER PUBLICATIONS

Application as Filed for U.S. Appl. No. 11/455,334, filed Jun. 19, 2006, 10 pp.

(Continued)

*Primary Examiner*—Bernard E Souw
(74) *Attorney, Agent, or Firm*—King & Spalding LLP

(57) ABSTRACT

A system for the non-contact detection of analyte chemicals, including explosives, chemical warfare agents and the like, employs a non-equilibrium plasma that is maintained at a temperature sufficiently low so as to avoid thermal damage to a surface, such as clothing or skin, that is being examined to thereby produce analyte ions and other charged particles. The ions are collected and passed into a sensor for detection and identification.

20 Claims, 5 Drawing Sheets

U.S. PATENT DOCUMENTS

| | | | | |
|---|---|---|---|---|
| 4,976,920 | A * | 12/1990 | Jacob | 422/23 |
| 4,977,320 | A | 12/1990 | Chowdhury et al. | 250/288 |
| 4,999,492 | A | 3/1991 | Nakagawa | 250/281 |
| 5,141,532 | A | 8/1992 | Sacks et al. | 95/87 |
| 5,142,143 | A | 8/1992 | Fite et al. | 250/288 |
| 5,164,704 | A | 11/1992 | Steen et al. | 340/539.17 |
| 5,168,068 | A | 12/1992 | Yanagisawa et al. | 436/134 |
| 5,171,525 | A * | 12/1992 | Jacob | 422/23 |
| 5,192,865 | A | 3/1993 | Zhu | 250/288 |
| 5,280,175 | A | 1/1994 | Karl | 250/287 |
| 5,304,797 | A | 4/1994 | Irie et al. | 250/287 |
| 5,305,015 | A | 4/1994 | Schantz et al. | 347/47 |
| 5,306,910 | A | 4/1994 | Jarrell et al. | 250/286 |
| 5,338,931 | A | 8/1994 | Spangler et al. | 250/287 |
| 5,412,208 | A | 5/1995 | Covey et al. | 250/288 |
| 5,412,209 | A | 5/1995 | Otaka et al. | 250/310 |
| 5,436,446 | A | 7/1995 | Jarrell et al. | 250/288 |
| 5,485,016 | A | 1/1996 | Irie et al. | 250/288 |
| 5,541,519 | A | 7/1996 | Stearns et al. | 324/464 |
| 5,559,326 | A | 9/1996 | Goodley et al. | 250/288 |
| 5,581,081 | A | 12/1996 | Kato et al. | 250/288 |
| 5,587,581 | A | 12/1996 | Stroosnyder | 250/287 |
| 5,625,184 | A | 4/1997 | Vestal et al. | 250/287 |
| 5,684,300 | A | 11/1997 | Taylor et al. | 250/286 |
| 5,736,740 | A | 4/1998 | Franzen | 250/288 |
| 5,747,799 | A | 5/1998 | Franzen | 250/288 |
| 5,750,988 | A | 5/1998 | Apffel et al. | 250/288 |
| 5,753,910 | A | 5/1998 | Gourley et al. | 250/288 |
| 5,756,994 | A | 5/1998 | Bajic | 250/288 |
| 5,798,146 | A | 8/1998 | Murokh et al. | 427/458 |
| 5,828,062 | A | 10/1998 | Jarrell et al. | 250/288 |
| 5,838,002 | A | 11/1998 | Sheehan | 250/288 |
| 5,873,523 | A | 2/1999 | Gomez et al. | 239/3 |
| 5,892,364 | A | 4/1999 | Monagle | 324/464 |
| 5,945,678 | A | 8/1999 | Yanagisawa | 250/423 F |
| 5,965,884 | A | 10/1999 | Laiko et al. | 250/288 |
| 5,986,259 | A | 11/1999 | Hirabayachi et al. | 250/288 |
| 6,040,575 | A | 3/2000 | Whitehouse et al. | 250/288 |
| 6,060,705 | A | 5/2000 | Whitehouse et al. | 250/288 |
| 6,107,628 | A | 8/2000 | Smith et al. | 250/292 |
| 6,124,675 | A | 9/2000 | Bertrand et al. | 315/111.91 |
| 6,147,345 | A | 11/2000 | Willoughby | 250/288 |
| 6,204,500 | B1 | 3/2001 | Whitehouse et al. | 250/287 |
| 6,207,954 | B1 | 3/2001 | Andrien, Jr. et al. | 250/288 |
| 6,223,584 | B1 | 5/2001 | Mustacich et al. | 73/23.41 |
| 6,225,623 | B1 | 5/2001 | Turner et al. | 250/286 |
| 6,239,428 | B1 | 5/2001 | Kunz | 250/287 |
| 6,278,111 | B1 * | 8/2001 | Sheehan et al. | 250/288 |
| 6,359,275 | B1 | 3/2002 | Bertsch et al. | 250/281 |
| 6,455,846 | B1 | 9/2002 | Prior et al. | 250/288 |
| 6,462,338 | B1 | 10/2002 | Inatsugu et al. | 250/292 |
| 6,465,776 | B1 | 10/2002 | Moini et al. | 250/285 |
| 6,486,469 | B1 | 11/2002 | Fischer et al. | 250/288 |
| 6,495,823 | B1 | 12/2002 | Miller et al. | 250/286 |
| 6,512,224 | B1 | 1/2003 | Miller et al. | 250/286 |
| 6,534,765 | B1 | 3/2003 | Robb et al. | 250/288 |
| 6,537,817 | B1 | 3/2003 | Papen | 436/49 |
| 6,583,407 | B1 | 6/2003 | Fischer et al. | 250/288 |
| 6,583,408 | B2 | 6/2003 | Smith et al. | 250/288 |
| 6,600,155 | B1 | 7/2003 | Andrien, Jr. et al. | 250/287 |
| 6,610,986 | B2 | 8/2003 | Hartley | 250/423 R |
| 6,649,907 | B2 * | 11/2003 | Ebeling et al. | 250/288 |
| 6,683,301 | B2 | 1/2004 | Whitehouse et al. | 250/288 |
| 6,690,004 | B2 | 2/2004 | Miller et al. | 250/286 |
| 6,727,496 | B2 | 4/2004 | Miller et al. | 250/287 |
| 6,744,041 | B2 | 6/2004 | Sheehan et al. | 250/283 |
| 6,750,449 | B2 | 6/2004 | Marcus | 250/288 |
| 6,784,424 | B1 | 8/2004 | Willoughby et al. | 250/292 |
| 6,815,668 | B2 | 11/2004 | Miller et al. | 250/286 |
| 6,818,889 | B1 | 11/2004 | Sheehan et al. | 250/288 |
| 6,822,225 | B2 | 11/2004 | Xu et al. | 250/287 |
| 6,852,969 | B2 | 2/2005 | Marcus et al. | 250/288 |
| 6,852,970 | B2 | 2/2005 | Yamada et al. | 250/288 |
| 6,867,415 | B2 | 3/2005 | Hughey et al. | 250/288 |
| 6,878,930 | B1 | 4/2005 | Willoughby et al. | 250/281 |
| 6,888,132 | B1 | 5/2005 | Sheehan et al. | 250/288 |
| 6,914,243 | B2 | 7/2005 | Sheehan et al. | 250/288 |
| 6,943,347 | B1 | 9/2005 | Willoughby et al. | 250/288 |
| 6,949,740 | B1 | 9/2005 | Sheehan et al. | 250/288 |
| 6,949,741 | B2 * | 9/2005 | Cody et al. | 250/288 |
| 6,972,407 | B2 | 12/2005 | Miller et al. | 250/287 |
| 6,998,605 | B1 | 2/2006 | Frazer et al. | 250/281 |
| 7,005,634 | B2 | 2/2006 | Shiokawa et al. | 250/288 |
| 7,041,966 | B2 | 5/2006 | Frazer et al. | 250/281 |
| 7,053,367 | B2 | 5/2006 | Tobita et al. | 250/288 |
| 7,060,976 | B2 * | 6/2006 | Sheehan et al. | 250/288 |
| 7,064,320 | B2 | 6/2006 | Yamada et al. | 250/288 |
| 7,078,068 | B2 | 7/2006 | Book | 426/140 |
| 7,083,112 | B2 | 8/2006 | Ivri | 239/4 |
| 7,087,898 | B2 | 8/2006 | Willoughby et al. | 250/288 |
| 7,091,493 | B2 | 8/2006 | Hiraoka | 250/425 |
| 7,095,019 | B1 | 8/2006 | Sheehan et al. | 250/288 |
| 7,112,785 | B2 | 9/2006 | Laramee et al. | 250/288 |
| 7,112,786 | B2 | 9/2006 | Russ, IV et al. | 250/288 |
| 7,138,626 | B1 * | 11/2006 | Karpetsky | 250/288 |
| 7,253,406 | B1 | 8/2007 | Sheehan et al. | 250/288 |
| 7,259,368 | B2 | 8/2007 | Frazer et al. | 250/281 |
| 7,274,015 | B2 | 9/2007 | Miller et al. | 356/508 |
| 7,429,731 | B1 * | 9/2008 | Karpetsky | 250/288 |
| 2002/0011560 | A1 | 1/2002 | Sheehan et al. | 250/283 |
| 2002/0175278 | A1 | 11/2002 | Whitehouse | 250/281 |
| 2002/0185593 | A1 | 12/2002 | Doring | 250/287 |
| 2002/0185595 | A1 | 12/2002 | Smith et al. | 250/288 |
| 2003/0034452 | A1 | 2/2003 | Fischer et al. | 250/288 |
| 2003/0038236 | A1 | 2/2003 | Russ, IV et al. | 250/288 |
| 2003/0197121 | A1 | 10/2003 | Turecek et al. | 250/281 |
| 2004/0161856 | A1 | 8/2004 | Handly | 436/177 |
| 2004/0245458 | A1 | 12/2004 | Sheehan et al. | 250/288 |
| 2005/0056775 | A1 * | 3/2005 | Cody et al. | 250/281 |
| 2005/0196871 | A1 * | 9/2005 | Cody et al. | 436/173 |
| 2006/0249671 | A1 * | 11/2006 | Karpetsky | 250/288 |
| 2007/0084999 | A1 | 4/2007 | Miller et al. | 250/288 |
| 2007/0114389 | A1 * | 5/2007 | Karpetsky et al. | 250/288 |
| 2008/0296493 | A1 | 12/2008 | Willoughby et al. | 250/288 |

FOREIGN PATENT DOCUMENTS

| | | | |
|---|---|---|---|
| GB | 2288061 | | 10/1995 |
| JP | 04215329 | | 8/1992 |
| JP | 05203637 | | 8/1993 |
| JP | 10088798 | | 4/1998 |
| WO | WO 93/14515 | | 7/1993 |
| WO | WO 98/07505 | | 2/1998 |
| WO | WO 99/63576 | | 12/1999 |
| WO | WO 00/08455 | | 2/2000 |
| WO | WO 00/08456 | | 2/2000 |
| WO | WO 00/08457 | | 2/2000 |
| WO | WO 01/33605 | A2 | 5/2001 |
| WO | WO 01/33605 | A3 | 5/2001 |
| WO | WO 03/010794 | | 2/2003 |
| WO | WO 2004/098743 | | 11/2004 |
| WO | WO 2004/110583 | | 12/2004 |
| WO | WO 2006/011171 | | 2/2006 |
| WO | WO 2006/122121 | | 11/2006 |
| WO | WO 2008/054393 | | 5/2008 |

OTHER PUBLICATIONS

Application as Filed for U.S. Appl. No. 11/455,252, filed Oct. 7, 2006, 49 pp.

Application as Filed for U.S. Appl. No. 12/153,358, filed May 16, 2008, 46 pp.

Application as Filed for U.S. Appl. No. 11/987,632, filed Dec. 3, 2007, 46 pp.

Application as Filed for U.S. Appl. No. 12/200,941, filed Aug. 29, 2008, 21 pp.
Application as Filed for U.S. Appl. No. 12/344,872, filed Dec. 29, 2008, 39 pp.
Le, Hue P., "Progress and Trends in Ink-Jet Printing Technology" [online],*Journal of Imaging Science and Technology*, vol. 42, No. 1, Jan./Feb. 1998 [retrieved on May 15, 2008], 28 pp., Retrieved from the Internet: http://www.imaging.org/resources/web_tutorials/inkjet.cfm.
Scott, R.P.W., "Gas Chromatography Detectors" [online], Part of the Chrom. Ed. Series, Subsection: Thermal Argon Detector, Copyright 2002-2005 [retrieved on Apr. 28, 2006], 7 pp., Retrieved from the Internet: http://www.chromatography-online.org/GC-Detectors/Ionization-Detectors/Thermal-Argon/rs61.html.
Scott, R.P.W., "Gas Chromatography Detectors" [online], Part of the Chrom. Ed. Series, Subsection: Macro Argon Detector, Copyright 2002-2005 [retrieved on Apr. 28, 2006], 10 pp., Retrieved from the Internet: http://www.chromatography-online.org/GC-Detectors/Ionization-Detectors/Macro-Argon/rs54.html.
Scott, R.P.W., "Gas Chromatography Detectors" [online], Part of the Chrom. Ed. Series, Subsection: Micro Argon Detector, Copyright 2002-2005 [retrieved on May 11, 2006], 6 pp., Retrieved from the Internet: http://www.chromatography-online.org/GC-Detectors/Ionization-Detectors/Micro-Argon/rs59.html.
Scott, R.P.W., "Gas Chromatography Detectors" [online], Part of the Chrom. Ed. Series, Subsection: The Helium Detector, Copyright 2002-2005 [retrieved on Apr. 28, 2006], 8 pp., Retrieved from the Internet: http://www.chromatography-online.org/GC-Detectors/Ionization-Detectors/Helium/rs64.html.
Laroussi, M., and Lu, X., "Room-Temperature Atmospheric Pressure Plasma Plume for Biomedical Applications," *Applied Physics Letters* 87, 113902, Sep. 8, 2005.
Akishev, Yu, et al., "Negative Corona, Glow and Spark Discharges in Ambient Air and Transitions Between Them," *Plasma Sources Sci. Technol.*, vol. 14, pp. S18-S25 (2005).
Willoughby, Ross C., et al., "Transmission of Ions Through Conductance Pathways from Atmospheric Pressure," *Proceedings of the 52nd ASMS Conference on Mass Spectrometry and Allied Topics*, Nashville, Tennessee, 2 pp., May 23-27, 2004.
Sheehan, Edward W., et al., "Atmospheric Pressure Focusing," *Proceedings of the 52nd ASMS Conference on Mass Spectrometry and Allied Topics*, Nashville, Tennessee, 2 pp., May 23-27, 2004.
Benocci, R., et al., "I-V Characteristics and Photocurrents of a He Corona Discharge Under Flow Conditions," *J. Phys. D: Appl. Phys.*, vol. 37, pp. 709-714 (2004).
Bokman, C. Fredrik, "Analytical Aspects of Atmospheric Pressure Ionization in Mass Spectrometry," Acta Universitatis Upsaliensis, *Comprehensive Summaries of Uppsala Dissertations from the Faculty of Science and Technology*, vol. 748, 46 pp., 2002.
Willoughby, R., Sheehan, E., Mitrovich, A., "A Global View of LC/MS," Global View Publishing, pp. 64-64, 470-471, Copyright 2002.
Stach, J., et al., "Ion Mobility Spectrometry - Basic Elements and Applications," *International Journal for Ion Mobility Spectrometry*, IJIMS 5(2002)1, pp. 1-21, 2002.
Hanley, Luke, et al., "Surface Mass Spectrometry of Molecular Species," *Journal of Mass Spectrometry*, vol. 34, pp. 705-723 (1999).
Steinfeld, Jeffrey ., et al., "Explosives Detection: A Challenge for Physical Chemistry," *Annual Review of Physical Chemistry*, vol. 49, pp. 203-232, Oct. 1998.
Lin, B., Sunner, J., "Ion Transport by Viscous Gas Flow Through Capillaries," *J. Am. Soc. Mass Spectrom.* 5, pp. 873-885 (1994).
Potjewyd, J., "Focusing of Ions in Atmospheric Pressure Gases Using Electrostatic Fields," Ph.D. Thesis, University of Toronto (1983).
Mahoney, J. F., et al., "A Theoretical and Experimental Basis for Producing Very High Mass Biomolecular Ions by Electrohydrodynamic Emission," *22nd IEEE Industry Applications Society Annual Meeting*, Atlanta, Georgia, Oct. 18-23, 1987.
Olivares, J. A., et al., "On-Line Mass Spectrometric Detection for Capillary Zone Electrophoresis," *Anal. Chem.* 59, pp. 1230-1232 (1987).
Lee, T. D., et al., "An EHD Sources for the Mass Spectral Analysis of Peptides," *Proceedings of the 36th ASMS Conference on Mass Spectrometry and Allied Topics*, San Francisco, California, Jun. 5-10, 1988.
Smith, R. D., et al., "Capillary Zone Electrophoresis-Mass Spectrometry Using an Electrospray Ionization Interface," *Anal. Chem* . 60, pp. 436-441 (1988).
Lee, T. D., et al. "Electrohydrodynamic Emission Mass Spectra of Peptides," *Proceedings of the 37th ASMS Conference on Mass Spectrometry and Allied Topics*, Miami Beach, Florida, May 21-26, 1989.
Mahoney, J. F., et al., "Electrohydrodynamic Ion Source Design for Mass Spectrometry: Ionization, Ion Optics and Desolvation," *Proceedings of the 38th ASMS Conference on Mass Spectrometry and Allied Topics*, Tucson, Arizona, Jun. 3-8, 1990.
Feng, X., et al., "Single Isolated Droplets with Net Charge as a Source of Ions," *J. Am. Soc. Mass Spectrom*, 11, pp. 393-399 (2000).
Schneider, B. B., et al., "An Atmospheric Pressure Ion Lens to Improve Electrospray Ionization at Low Solution Flow-Rates," *Rapid Commun. Mass Spectrom* 15, pp. 2168-2175 (2001).
Alousi, A., et al., "Improved Transport of Atmospheric Pressure Ions Into a Mass Spectrometer," *The Proceedings of the 50th ASMS Conference on Mass Spectrometry and Allied Topics*, Orlando, Florida, Jun. 2-6, 2002.
Klesper, H., et al., "Intensity Increase in ESI MS by Means of Focusing the Spray Cloud onto the MS Orifice," *The Proceedings of the 50th ASMS Conference on Mass Spectrometry and Allied Topics*, Orlando, Florida, Jun. 2-6, 2002.
Schneider, B. B., et al., "An Atmospheric Pressure Ion Lens that Improves Nebulizer Assisted Electrospray Ion Sources," *J. Am. Soc. Mass Spectrom.* 13, pp. 906-913 (2002).
Hartley, F. T., et al., "NBC Detection in Air and Water," *Micro/Nano* 8, pp. 1, 2, and 8 (Dec. 2003).
Cody, R. B., et al., "Versatile New Ion Source for the Analysis of Materials in Open Air Under Ambient Conditions," *Anal. Chem.* 77, pp. 2297-2302 (2005).
McEwen, C. N., et al., "Analysis of Solids, Liquids, and Biological Tissues Using Solids Probe Introduction at Atmospheric Pressure . . . ," *Anal. Chem.* 77, pp. 7826-7831 (2005).
Niessen, W.M.A. and van der Greef, J., "Liquid Chromatography—Mass Spectrometry Principles and Applications," Marcel Dekker, Inc., New York, New York, pp. 339-341, Copyright 1992.
Hart, K. J., et al., "Reaction of Analyte Ions With Neutral Chemical Ionization Gas," *Journal of the American Society for Mass Spectrometry*, vol. 3, No. 5, pp. 549-557, 1992 (ISSN 1044-0305).
Bruins, A.P., "Mass Spectrometry With Ion Sources Operating at Atmospheric Pressure," *Mass Spectrometry Reviews*, vol. 10, pp. 53-77, 1991.
Duckworth, D. C., et al., "Radio Frequency Powered Glow Discharge Atomization/Ionization Source for Solids Mass Spectrometry," *Analytical Chemistry*, vol. 61, No. 17, pp. 1879-1886, Sep. 1, 1989.
Beres, S.A., et al., "A New Type of Argon Ionisation Detector," *Analyst*, vol. 112, pp. 91-95, Jan. 1987.
Lovelock, J.E. and Lipsky, S.R., "Electron Affinity Spectroscopy—A New Method for the Identification of Functional Groups in Chemical Compounds Separated by Gas Chromatography," *J. Amer. Chem. Soc.*, vol. 82, pp. 431-433, Jan. 20, 1960.
Lovelock, J.E., "A Sensitive Detector for Gas Chromatography," *Journal of Chromatography*, vol. 1, pp. 35-46, 1958.
Lovelock, J.E., "Measurement of Low Vapour Concentrations by Collision with Excited Rare Gas Atoms," *Nature*, vol. 181, pp. 1460-1462, 1958.
Guimbaud, C., et al., "An APCI Ion Source to Monitor $HNO_3$ Under Ambient Air Conditions" [online], 1 p., Retrieved from the Internet: http://lch.web.psi.ch/pdf/anrepo3/19.pdf.
Cody, et al., "DART™: Direct Analysis in Real Time for Drugs, Explosives, Chemical Agents, and More . . . ," Sanibel Conference (American Society for Mass Spectrometry Sanibel Conference on Mass Spectrometry in Forensic Science and Counter-Terrorism), Clearwater, Florida, 39 pp., Jan. 28-Feb. 1, 2004.

* cited by examiner

NON-CONTACT DETECTOR SYSTEM WITH PLASMA ION SOURCE

REFERENCE TO RELATED APPLICATIONS

This application claims the benefit of U.S. Provisional Patent Application No. 60/734,633 that was filed Nov. 8, 2005.

BACKGROUND OF THE INVENTION

1. Field of the Invention

This invention relates to a method and apparatus for the direct, non-contact, sampling and detection of minute quantities of materials on surfaces.

More particularly, this invention is directed to a method and apparatus for impinging a plasma upon a surface being explored to create ions from materials on that surface, collecting the produced ions, and thereafter analyzing the ions to identify the material.

2. Description of Related Art

Military, security, and law enforcement concerns, as well as environmental monitoring and similar needs, all require a capability to sample and detect minute quantities of explosives, drugs, chemical and biological agents, toxic industrial chemicals and other compounds of interest on or in a variety of materials and surfaces. For most of those applications, it is extremely desirable that the analysis be performed with speed, accuracy, and on site.

Many of the chemical detection techniques and instruments in use for such purposes at this time rely upon the production and subsequent separation and identification of ions derived from targeted analyte chemicals. For example, among others, mass spectrometry, which utilizes ions to unambiguously identify analyte chemicals, and ion mobility spectrometry and differential mobility spectrometry, which compare the behavior of ions derived from the sampled chemical with libraries of characterized ions having known behavior. Such techniques are often preceded by sample treatment which can, for example, consist of the separation of chemicals in a complex mixture by chromatography or other techniques. The chemicals of interest must be ionized either before, during, or after such sample treatment and prior to detection and identification in a sensor having an output that depends upon some property of ions.

The ionization of chemicals can be accomplished by altering the molecular or electronic composition of the chemical through exposure to certain reagents, radioactivity, and/or heat. For example, many detectors use $^{63}Ni$ to produce ions from chemicals in air. These ions are then directed to a sensor capable of detecting and identifying ions of interest and thereby providing information regarding the presence or absence of targeted chemicals. Other ways to produce ions include chemical reactions, ultraviolet energy, and thermal energy.

One limitation of such techniques has been the vapor pressure of the targeted chemical. For sensor technologies that are dependent on detecting ions in an air or gas stream, there must be a sufficient supply of targeted chemical molecules in air to produce enough ions to meet the threshold detection limits of such sensors. The detection of explosives is a case in point. The saturated (air) vapor pressures of explosives range over at least seven orders of magnitude. This means that air around different explosives contains some, little or virtually no molecules of these different explosives. The consequences of such dependences of a detection technology on vapor pressure are that some explosives are detected, others detected poorly, and some not detected at all. Various techniques have evolved over time to deal with this deficiency. For example, chemicals can be concentrated from air using polymers or filters, or solid particles can be gathered on filters by vacuum methods. Subsequent heating of such filters or polymers to vaporize the entrained chemicals can result in sufficient chemical in vapor form for ionization and subsequent detection. However, these techniques require additional equipment and consumables (preconcentrators, filters, wipes, heaters), time, and operator training. These factors increase the cost of detection and reduce the number of detections that can be accomplished per unit time. They also introduce a variable into the results related to the adequacy of training and attention to protocol of the individual performing the procedures.

A means to directly ionize chemicals on surfaces, as well as in air, would eliminate the need for time-consuming and expensive multiple step sample collection and ionization procedures. Such a means has been described in commonly assigned patent application Ser. No. 11/122,459. In that application means were described whereby ions and energetic species produced in a gas discharge were then carried in a gas stream that was directed upon a target surface to subsequently ionize chemicals on that surface or in air in proximity to the surface. This technique was found to greatly reduce the dependence of detection on target chemical vapor pressure. For example, explosives having saturated air vapor pressures ranging over seven orders of magnitudes were detected approximately equally well, and in less than four seconds, using this technique.

The invention described in this application provides a new and different approach to ionizing target chemicals on a surface through use of a low to moderate temperature, atmospheric, or near atmospheric, pressure plasma plume that is projected directly upon the surface to create ions which are then collected and identified.

SUMMARY OF THE INVENTION

The detector system of this invention employs a low to moderate temperature, non-equilibrium plasma ionization source operating at atmospheric, or near atmospheric, pressure to create ions directly from chemicals or other materials on a surface. Ions produced by the plasma are collected and are then identified through use of an appropriately selected analyzer such as a differential mobility spectrometer or a mass spectrometer. The plasma may be generated by applying high voltage, high frequency pulses between two spaced-apart electrodes mounted in a dielectric housing or by using a single electrode within a dielectric tube, or by other means. A flow of gas, for example air, helium, or argon, is passed through an ionization source resulting in the projection of a plasma plume outwardly from the source for a distance as great as two inches or more.

DESCRIPTION OF PREFERRED EMBODIMENTS OF THE INVENTION

Figure 1:
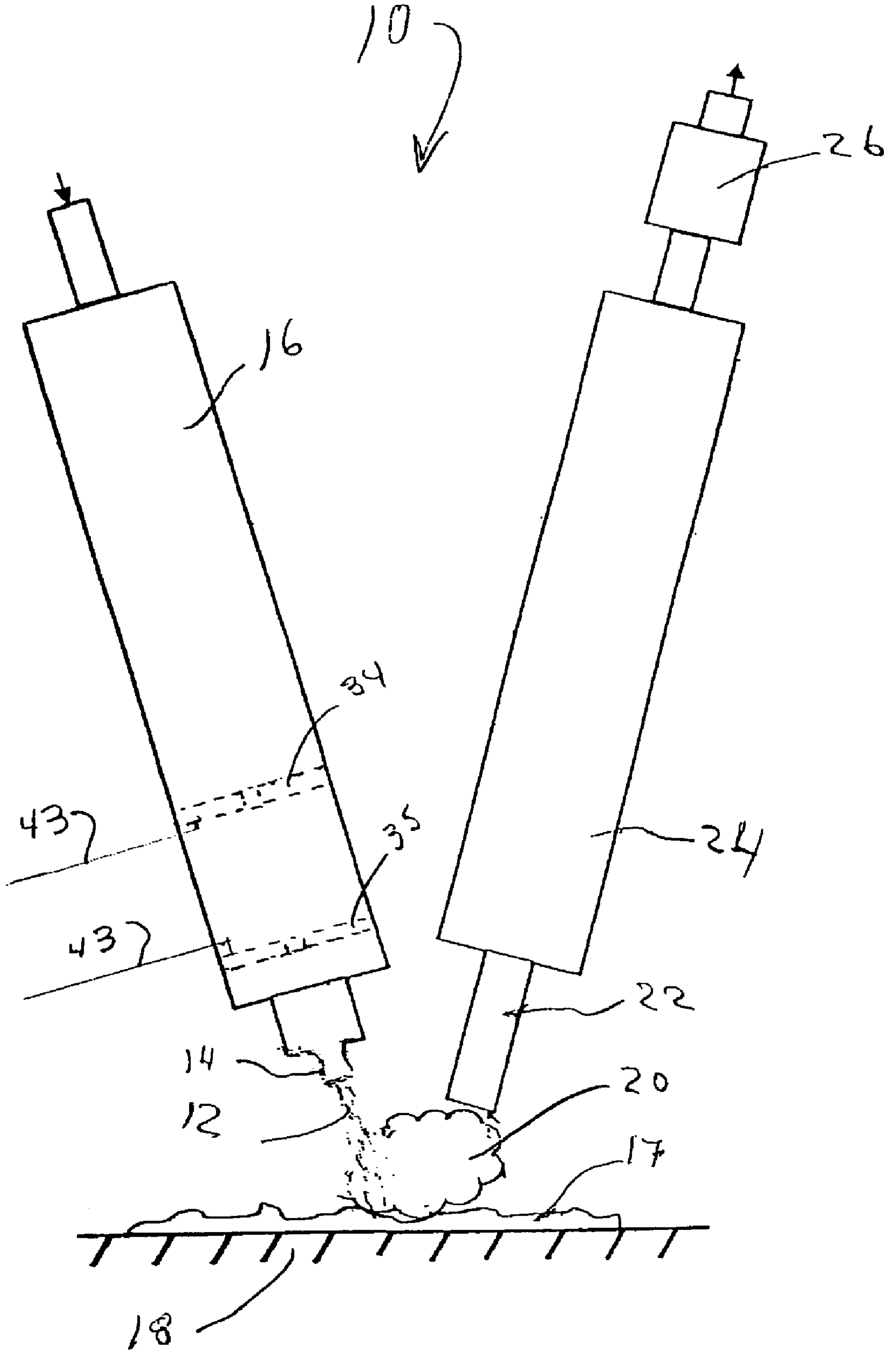
FIG. 1 is a schematic representation showing the arrangement of the ion production and ion detection and identification means according to this invention.

The detector system 10 of FIG. 1 operates at ambient pressure, without sample contact, by producing a non-equilibrium plasma plume 12 of electrons, ions and possibly other excited species, that exits from outlet 14 of plasma production means 16. Plasma plume 12 is directed toward a sample material 17, in place on surface 18, producing a reaction cloud 20 that contains ions of the sample material in admixture with the atmosphere adjacent to surface 18.

The plasma plume can be focused using electrical and/or magnetic fields and accelerated aerodynamically and/or using differential voltage arrays to control beam shape and the velocity with which the charged species impact upon the surface 18. A stream of ion-rich gas is then pulled into ion concentration and port means 22 of ion detection and identification means 24. Movement of the ion-rich gas stream can be purely aerodynamic or can be assisted by the presence of electrical fields to control the movement of sample ions toward port 22. The ion stream can be compressed or shaped using ion optics, and collisions with walls or other surfaces can be avoided using conductive pathways.

Figure 2:
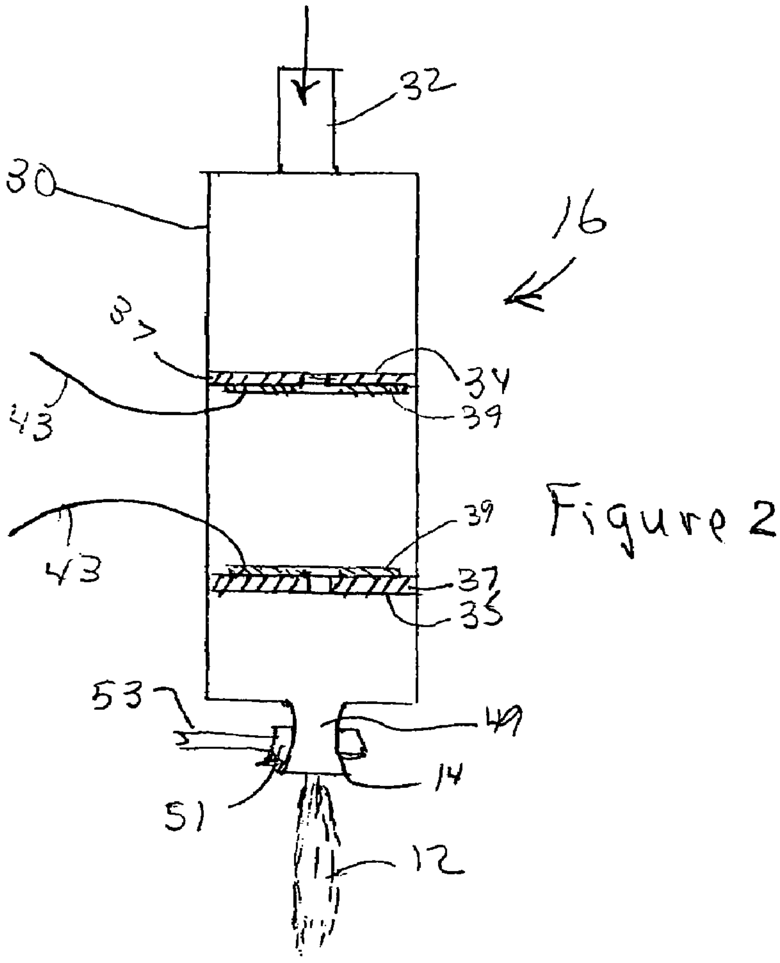
FIG. 2 is a schematic representation of the ion production means of the FIG. 1 system.
Figure 3:
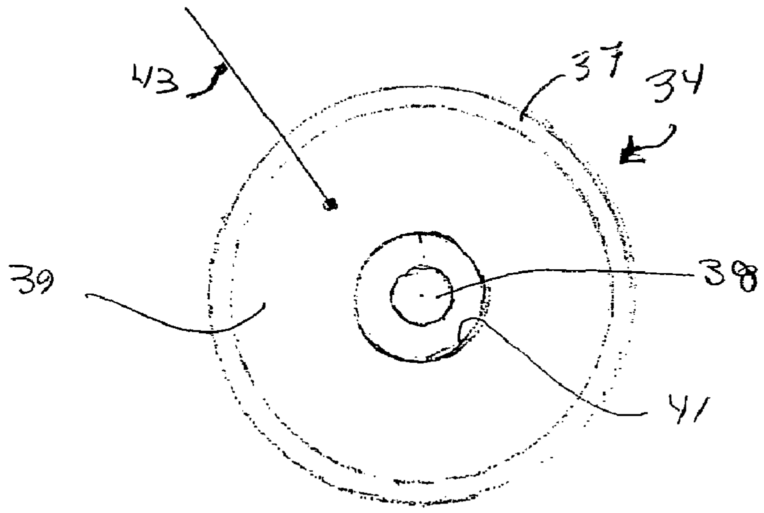
FIG. 3 is a plan view of an electrode used in the ion production means.

Plasma plume 12, produced in production means 16, is a low to moderate temperature, non equilibrium, atmospheric or near atmospheric pressure plasma that is safe to touch and to place into contact with delicate materials without harm. One way for producing such a plasma plume is through use of a single sharp edged electrode such as, for example, a needle electrode of the kind illustrated in U.S. Pat. No. 5,798,146. Another suitable device for the production of such a plasma is described in an article by M. Laroussi and X. Lu which was published in Applied Physics Letters 87, 113902, Sep. 8, 2005. Ion production means 16 is of simple construction as is schematically illustrated in FIGS. 2 and 3. Turning now to those Figures, means 16 comprises a housing 30 which is preferably cylindrical in shape and having an entry port 32 for gas at one end thereof. A pair of electrodes 34, 35, spaced apart and conforming to the circular shape of the housing interior, are disposed within the housing. Each electrode consists of a dielectric, washer-shaped base member 37 having a central orifice 38 allowing a flow of gas therethrough. A conductive member 39, suitably metal, is layered onto one side of each base member. Conductive member 39 is also washer-shaped and suitably fabricated of metal. It has an exterior diameter less than the diameter of base member 37 and has a central orifice 41 that is greater in diameter than is orifice 38. The two electrodes may be fixed, one relative to the other, or one electrode may be movable so as to adjust the spacing between the two.

An electrical lead 43 is attached to the conductive member 39 of each electrode and the leads, in turn, are connected to a power supply (not shown) which delivers very short duration, high voltage pulses to the conductive members at a frequency above 1 Hz. Any alternating or direct current, pulsed power supply of sufficient power (current) that can deliver voltage pulses of those frequencies and at voltages above about 300V is suitable. The minimum voltage necessary to establish a plasma depends to some degree upon the geometric arrangement of the plasma source. A gas, which may be for example, air, helium, argon, or mixtures of such gases, is passed through the plasma production means while the power supply is delivering high voltage pulses to the electrodes initiating a plasma discharge and causing a plasma plume 12 to issue from the outlet 14 of the plasma production means 16.

The electrical field that is produced by the very short duration, high voltage pulses transfers energy to free electrons which are heated to extremely high temperatures, i.e., to 10,000K or even higher. Those high temperature electrons produce positive and negative ions and may also excite or dissociate neutral species resulting in the production of active radicals and the like. The gas flow rate and other operating parameters are selected such that the excited electrons do not convey kinetic energy to, and thus heat up the gas passing through the plasma source, resulting in the production of a non-equilibrium plasma. Such non-equilibrium plasmas can be sustained at low temperatures, room temperature or near room temperature, to produce a plasma plume that will not cause thermal damage to fabrics or exposed skin.

Power to produce a suitable plasma may also be provided by alternating current at a fixed or varying frequency. Voltages can be fixed or varied to produce plasmas having different properties. Other non-equilibrium gas plasmas can be produced without the gas coming in direct contact with the electrodes. These include inductively coupled plasmas and capacitively coupled plasmas. Other non-equilibrium plasmas can be made using dielectric or resistive barrier discharge devices. Further, plasmas can be made that are produced using an electrode with the second electrode being not well-defined.

The length of plasma plume 12 may be as great as two inches or more and the plume length is determined to some extent by the rate of gas flow through the device as well as its structural geometry. In a preferred embodiment, the outlet 14 from the plasma production means is formed as a nozzle 49 to more narrowly confine the gas flow from the outlet thereby extending the reach of plasma plume 12. Nozzle 49 may also be configured to include a manifold means 51 that directs the flow of a sheath gas to surround the plasma plume and thereby reduce interaction of the plasma with the ambient atmosphere. The sheath gas may be, and preferably is, the same as that passing through the plasma production means and is supplied to manifold 51 by way of conduit 53. In another embodiment, the sheath gas may include gases that react with the plasma to produce energetic or reactive species.

Plasma plume 12 will typically comprise a variety of energetic species including, for example, electrons with other species such as ionic species, radicals, and neutral species and those energetic species can be aerodynamically projected or moved to the surface with sufficient velocity to accomplish the ionization of targeted surface chemicals. The plasma plume, or any or all of the above species can be enclosed in a sheath gas as they move from the plasma region to the surface. Ionic or charged species created in the plasma or by subsequent reaction with other neutral or ionic or radical species can be focused, eliminated, or accelerated using electronic elements to control ion movement. For example, an ion aperture, concentration and transmission device can be used to collect charged species by the means noted above, compress them into a charged species enriched stream and transmit them to an aperture from which they can be projected into space or onto a surface to react with chemicals found either in space or on the surface, producing ions from those chemicals.

The plasma can also interact with other gases in the surrounding atmosphere or with gases that are added to the plasma, after the electrodes, and/or between the outlet 14 and the surface. The addition of reactive gases or chemicals, such as dopants, either in the plasma or in the path of the plasma between the plasma device and the surface containing chemicals can modify the nature of the ions produced from the surface chemicals. Such added chemicals can enhance or suppress surface or vapor chemical ion formation or can result in different ions being produced from the same surface or vapor material. One way to effect this is to add the chemical or gas to the plasma itself. Another is to add the chemical or gas to the stream of energetic species issuing from the plasma and to direct that combined stream onto a surface containing chemicals. Alternatively, an ion aperture, concentration and transmission device may be used to collect the charged, energetic species, compress them into an enriched stream, and transmit them to an aperture from which is projected into space or onto surfaces to produce ions from target chemicals. Those interactions can produce other ionic, neutral, radical, and/or energetic species and/or electrons that cause surface chemicals to ionize. The collected ions can then be presented to the inlet 22 of ion identification means 24.

Means 24 may comprise any of a variety of sensors that use physical and/or chemical means to separate, detect and identify ions and the chemicals from which they were derived. Such means include, but are not limited to ion apertures, ion optics, high transmission elements, ion focusing devices, and conductance pathways to collect, compress and urge the movement of ions formed from the surface or in the air towards the inlet of a sensor which can be, but is not limited to be, a mass spectrometer, an ion mobility spectrometer, a differential mobility spectrometer or other means that detect ions.

A particularly preferred Ion detection and identification sensor means 24 comprises a miniaturized differential mobility spectrometer that is described in U.S. Pat. No. 6,512,224 to Miller et al, the entire disclosure of which is incorporated herein by reference. The differential mobility spectrometer that is described in the Miller et at patent is commercially available from Sionex Corporation. It is microfabricated in a manner analogous to the manufacture of a printed circuit and is in the form of a planar array having an overall size on the order of 36×72 mm, with a plate spacing of about half a millimeter.

Figure 4:
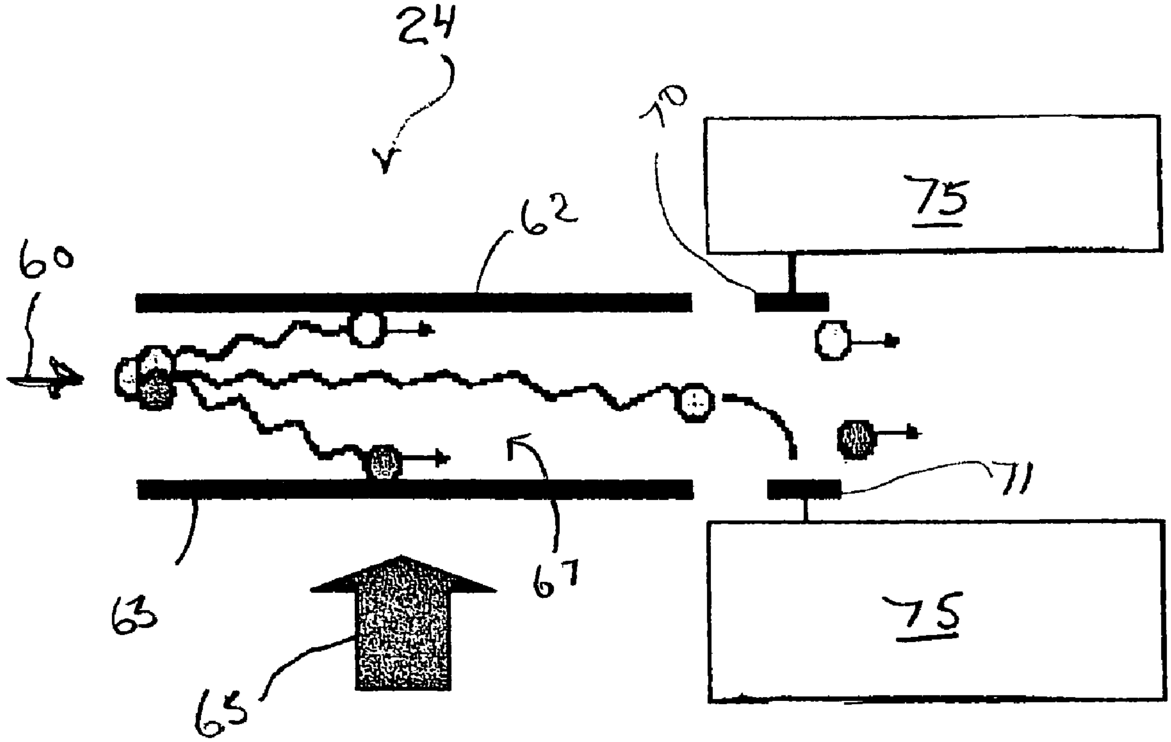
FIG. 4 is a diagrammatic representation of a surface sample ion detection and identification means according to the present invention.
Figure 5:
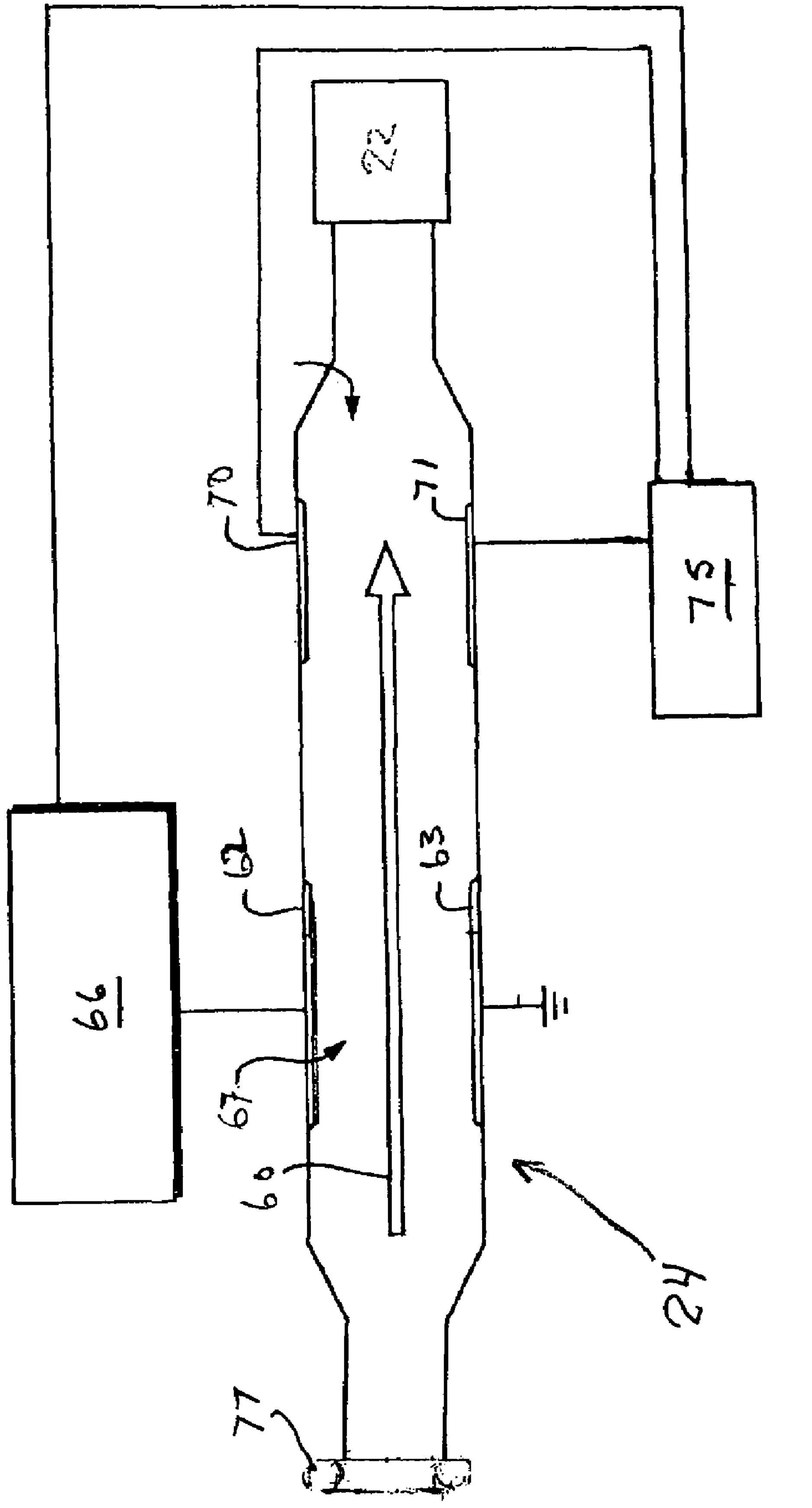
FIG. 5 is a partial cross-sectional representation of the ion detection and identification means of FIG. 4.
Figure 6:
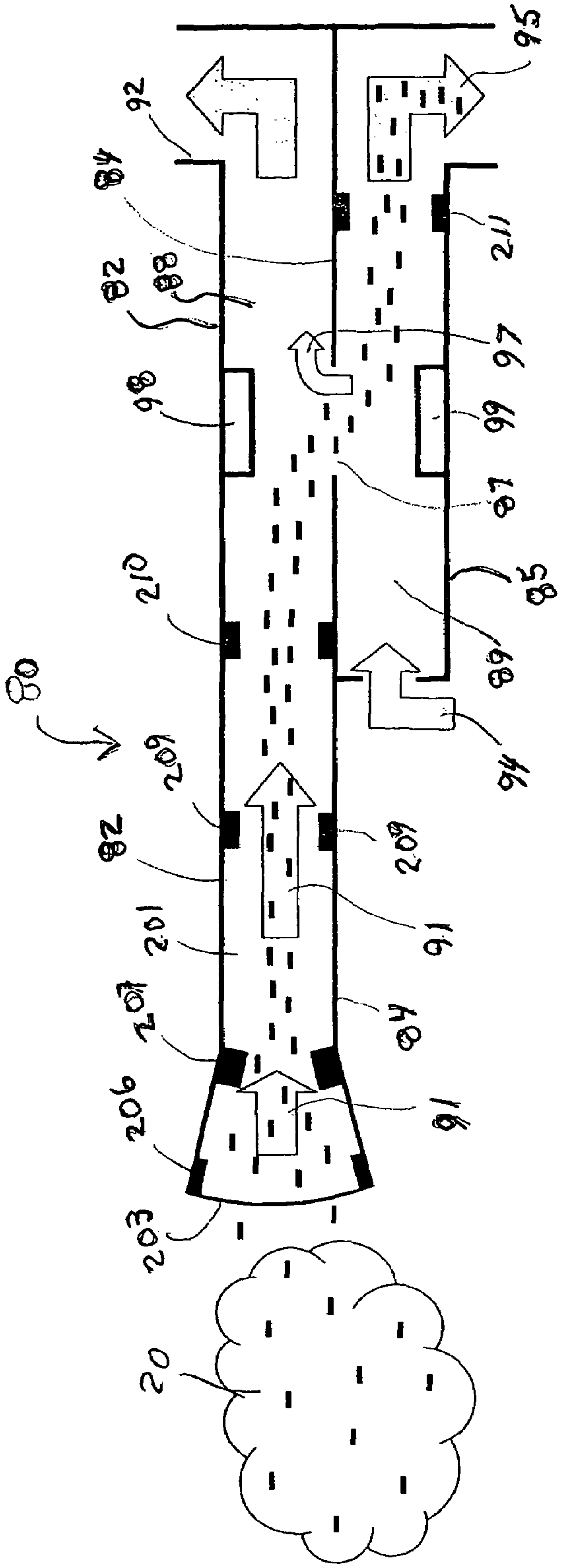
FIG. 6 is a cross-sectional representation of an ion inlet arranged with a surface sample concentration and change of ion carrier gas means for use with the detection and identification means of FIGS. 4 and 5.

Sensor means 24 is shown in schematic cross-section in FIGS. 4 and 5 and comprises a microfabricated planar array that forms an ion filter having no moving parts. A stream of ions 60, carried in a gas, is flowed between filter plates 62 and 63 of sensor 24. An asymmetric oscillating RF field 65 is applied perpendicular to the ion flow path 67 between filter plates 62 and 63 to impart a zigzag motion (FIG. 4) to the ions. At the same time, a DC compensation voltage is applied between plates 62 and 63 to control the motion of the ions such that some travel all the way through the plate array and are detected by electrodes 70 and 71, while others are directed to one or the other of plates 62 and 63 and are neutralized.

Two or more detector electrodes are located downstream from the filter plates. One of the electrodes, 70, is maintained at a predetermined voltage while the other of the electrodes 71 is typically at ground. Electrode 70 deflects ions downward to electrode 71 where they are detected. Depending upon the ion and upon the voltage applied to the electrodes, either electrode 70 or electrode 71 may be used to detect ions or multiple ions may be detected by using electrode 70 as one detector and electrode 71 as a second detector. In this way, both positively and negatively charged ions can be detected simultaneously. The output of the detector electrodes is transmitted to an electronic controller 75 where the signal is amplified and analyzed according to algorithms that serve to identify the ion species. Also, there may be provided an entry port electrode 77 (FIG. 5) to which either a positive or negative charge may be applied so as to attract oppositely charged ions toward and into the ion detection means 24.

Ion detection sensitivities may be increased as much as 10-fold or more through use of an ion inlet and concentration means 80 shown in diagrammatic cross section in FIG. 8. This device may comprise or include port means 22 of FIG. 1. It serves to draw sample ions into the inlet and to change the gas containing the ions from ambient air collected at and near the sample and of uncontrolled composition, to air or other gas of defined composition, alone or in combination with other gases, including dopants such as methylene chloride and the like, which can be ionized using a very small UV lamp elsewhere in the detector.

Means 80 includes an inlet portion 201 that comprises a conduit having an upper wall 82 and a lower wall 84. A conductive, apertured entry 203 is provided at one end of the conduit to which a polarity and potential sufficient to attract the incoming ions contained in adjacent reaction cloud 111 is applied. Electrodes 206 and 207 are disposed around the inner periphery of conduit 201 just downstream of entry 203 and are of polarity and potential sufficient to attract and focus incoming surface analyte ions. Preferably the potential applied to entry 203 and to electrode 206 are similar and that of 207 is higher. Additional electrodes 209 and 210 are disposed around the inner periphery of conduit 201 further downstream from the entry. These last electrodes carry a controllable potential that is of the same polarity as is the incoming ion stream and serve to focus the ions into the central area of the conduit.

Reaction cloud 20 comprises a mixture of the gas issuing from the plasma production means 16 and the ambient atmosphere, and contains sample ions formed by interaction of energetic ions from means 16 with sample materials, or analyte, 17 in place on surface 18. A stream of gas 91, comprising reaction cloud 20, is drawn through conduit 201 by action of pump 26 (FIG. 1), and the ion concentration in that gas stream is increased due to the attractive influence of the potential field created by the charge applied to inlet 203.

The gas exchange portion of means 80 comprises a two-chamber conduit formed by a partition wall portion 85 that is disposed exterior to and generally parallel with conduit walls 82 and 84. An orifice 87 located between the chamber ends is arranged to allow gas flow between upper chamber 88 and lower chamber 89. A flow of ions in the ambient sample atmosphere 91 is directed into the entry of the upper chamber 88. The ambient sample atmosphere with ions removed exhausts from the chamber 88 end at 92. Meanwhile, a second gas stream 94, for example, suitably preconditioned dry air, is directed into the entry of the lower chamber 89. Gas stream 94 passes through chamber 89 and the exiting flow 95 is then directed into the entry of ion detection means 24. The cross sectional area of chamber 88 relative to chamber 89 and the flow rate of sample atmosphere 91 relative to the flow rate of the second gas stream 94 are adjusted such that there is a small and constant bleed 97 of gas from the lower chamber 89 into the upper chamber 88 through the orifice 87.

A first electrode 98 having the same polarity as the incoming ions in sample stream 91 is located within chamber 88 above the orifice 87, while a second similar electrode 99, having a polarity opposite to the incoming ions, is located within chamber 89 below the orifice. As the ions in sample stream 91 approach electrode 98, they are repelled and are directed toward and through orifice 87. At the same time, the ions are attracted toward electrode 99, which tends to pull ions from sample stream 91 through the orifice and into gas stream 94. There may also be provided one or more guiding or focusing electrodes 211 located in chamber 89 downstream from orifice 87 to shape or accelerate the ion stream. By adjusting the flow of gas stream 94 to a level substantially less than the flow of gas stream 91, a concomitant concentration of ions in stream 94, to a level as high as ten fold of that of sample stream 91, is achieved. In addition to ion concentration, there is achieved a fairly complete elimination of helium or argon from the gas stream that enters sensor 24 in those situations where either helium or argon is present in the reaction cloud 20.

As was set out previously, a preferred ion detector 24 is a microfabricated differential mobility spectrometer that typically has a plate spacing on the order of half a millimeter. That small plate spacing allows use of much higher electric fields than are usual in other detector systems such as those employing ion mobility spectrometers; e.g. as high as about 35,000 V/cm compared to about 600 V/cm. Higher variable electric fields allow the changes in the mobility of ions as a function of field strength to be exploited to enhance selectivity and resolution. However, the maximum electric field is limited by the voltage at which arcing between the plates occurs with resultant destruction of the detector. Arc over occurs at a much lower voltage with helium or argon than with air. Consequently, removal of helium and argon from the sample gas stream that is analyzed allows for operation of the detector at higher field voltages thus further increasing the selectivity of the system.

A number of other synergistic advantages are obtained through the combination of the described ion production and concentration means with this particular detector. First of all, the ion production means of this invention does not use radioactive elements for ion creation and is therefore free of the regulatory burden imposed on devices employing radioactive sources. The plasma plume is rich in energetic species and so creates a larger population of analyte ions than do conventional radioactive nickel or americium sources. Further, because the preferred detector examines far more of the ions that are produced, fewer false positives or negatives result and superior resolution of targeted chemical ions from interferents is obtained.

The components making up the system of this invention may be and preferably are assembled in a manner that facilitates different modes of use. In one such use mode, the system components are assembled as a fully portable, hand held detector. In another use mode, the system components are arranged at a fixed location, as for example, for use at a security or transportation check point to examine baggage or incoming deliveries on conveyor belts and the like. The system may also be deployed in a non-portable, bench top mode in those applications requiring high volume examination, or in the scanning of field-collected samples, or in those instances in which a detailed scanning and examination of suspect objects is required.

Other variations and modifications that are not specifically set out in the description herein will be apparent to those skilled in the art and the described invention is to be limited only by the scope of the following claims.

We claim:

1. A device for the non-contact detection and analysis of an analyte that is substantially residing upon a surface, comprising:
- a plasma source including a housing means having an upstream end and a downstream end;
- an inlet for a gas disposed at the upstream end of the housing means;
- an exit port at the downstream end;
- means for generating a non-equilibrium, low temperature plasma at substantially atmospheric pressure positioned within said housing intermediate said upstream and downstream ends, said plasma generating means arranged to allow flow of a gas through said means;
- focusing means disposed adjacent said exit port, said means arranged to urge the gas and plasma into a directed plume;
- means causing said directed plume to contact said surface to thereby ionize analyte on or adjacent said surface and to form analyte ions by transferring energy from energetic species contained in the plasma to the analyte; and
- an ion collection means and a sensor operably connected to said plasma source, said ion collection means having inlet port means arranged relative to said exit port of said plasma source to collect at least a potion of the analyte ions, and said sensor including means to identify and quantify the analyte.

2. The device of claim 1 wherein said sensor is a differential mobility spectrometer.

3. The device of claim 1 wherein said exit port is formed as a nozzle that is shaped to direct the gas flow and plasma plume.

4. The device of claim 3 wherein said nozzle includes a manifold means that is arranged to direct flow of a sheath gas to surround said plasma plume.

5. The device of claim 1 wherein said plasma generating means comprise a pair of electrodes that are spaced apart within said housing means, each said electrode conforming in shape to the interior of said housing and comprising a dielectric base member having a conductive member layered on a side thereof, each said electrode having an orifice allowing a flow of gas therethrough.

6. The device of claim 5 wherein each said electrode is fixed relative to the other electrode.

7. The device of claim 5 wherein one of said electrodes is movable relative to the other.

8. The device of claim 5 wherein said housing is generally circular in cross section and wherein said orifice is located in the center of each electrode.

9. The device of claim 5 wherein said conductive members are electrically connected to a power supply that is arranged to deliver very short duration, high voltage pulses to said conductive members.

10. The device of claim 1 wherein said ion collection means includes an ion concentration and gas exchange means, said ion concentration and gas exchange means comprising a two-chamber conduit having an orifice therebetween, a first of said conduits arranged to accept a flow of a first gas containing analyte ions and the second of said conduits arranged to accept a flow of a second gas stream; and means to cause ions to move through said orifice from said first gas to said second gas stream.

11. The device of claim 10 wherein said second gas stream is directed to said sensor.

12. A method for the non-contact detection and analysis of an analyte, comprising:
- producing a non-equilibrium, substantially atmospheric pressure, plasma plume that contains energetic species;
- directing said plasma plume into contact with an analyte residing upon a surface to thereby cause energetic species contained in the plasma plume to interact with said analyte to produce analyte ions in admixture with a gas atmosphere adjacent said analyte; and
- collecting at least a portion of the gas containing analyte ions, and passing said collected gas portion into a sensor to thereby detect and identify the analyte.

13. The method of claim 12 wherein the temperature of said plasma plume is maintained sufficiently low to avoid thermal damage to fabrics or exposed skin.

14. The method of claim 12 wherein said sensor comprises a differential mobility spectrometer.

15. The method of claim 12 wherein said plasma plume is generated by flowing a gas through an elongated housing that contains a pair of electrodes, each of the electrodes having a central orifice and comprising a dielectric base member having an electrically conductive member layered on a side thereof, said electrodes conforming in size and shape to the interior of said housing.

16. The method of claim 15 including applying very short duration, high voltage pulses to said electrically conductive members.

17. The method of claim 15 wherein said gas is selected from the group consisting of air, helium, argon, and mixtures thereof.

18. The method of claim 12 wherein a sheath gas surrounds said directed plasma plume.

19. The method of claim 12 wherein the analyte is selected from the group consisting of explosives, chemical warfare agents, toxic industrial chemicals, and mixtures thereof.

20. A method for producing analyte ions comprising:

generating a low temperature, non-equilibrium, substantially atmospheric plasma by passing a gas stream through a plasma generating means, said means comprising an elongated housing having gas entry means at one end thereof and a gas and plasma exit means at the other end thereof, and a plurality of spaced apart electrodes disposed within said housing, each said electrode having an orifice allowing flow of gas therethrough;

applying very short duration, high voltage pulses to said electrodes to thereby initiate a plasma discharge;

causing a plasma plume to issue from said exit means;

directing said plasma plume into contact with said analyte;

forming analyte ions by transferring energy from energetic species contained in the plasma to the analyte;

maintaining the temperature of the plasma plume sufficiently low as to avoid thermal damage to fabrics or exposed skin; and collecting a portion of the formed analyte ions.

* * * * *

UNITED STATES PATENT AND TRADEMARK OFFICE

CERTIFICATE OF CORRECTION

PATENT NO. : 7,576,322 B2
APPLICATION NO. : 11/594401
DATED : August 18, 2009
INVENTOR(S) : Timothy P. Karpetsky and John C. Berends, Jr.

It is certified that error appears in the above-identified patent and that said Letters Patent is hereby corrected as shown below:

On the Title Pg.

IN THE REFERENCES CITED SECTION - OTHER PUBLICATIONS -

On Page 2, Item 56, Line 1 under Other Publications, please change "Application as Filed for U.S. Appl. No. 11/455,252, filed Oct. 7," to -- Application as Filed for U.S. Appl. No. 11/544,252, filed Oct. 7, --

On Page 3, Item 56, Line 51, please change "LC/MS," Global View Publishing, pp. 64-64, 470-471, Copyright" to -- LC/MS," Global View Publishing, pp. 64-65, 470-471, Copyright --

On Page 3, Item 56, Line 1, please change "Lee T. D., et al., "An EHD Sources for the Mass Spectral Analysis of" to -- Lee, T. D, et al., "An EHD Source for the Mass Spectral Analysis of" --

Signed and Sealed this

Third Day of November, 2009

David J. Kappos

*Director of the United States Patent and Trademark Office*

UNITED STATES PATENT AND TRADEMARK OFFICE

CERTIFICATE OF CORRECTION

PATENT NO. : 7,576,322 B2 
APPLICATION NO. : 11/594401
DATED : August 18, 2009
INVENTOR(S) : Timothy P. Karpetsky and John C. Berends, Jr.

It is certified that error appears in the above-identified patent and that said Letters Patent is hereby corrected as shown below:

On the Title Pg.

IN THE REFERENCES CITED SECTION - OTHER PUBLICATIONS -

On Page 2, Column 2, Line 1 under Other Publications, please change "Application as Filed for U.S. Appl. No. 11/455,252, filed Oct. 7," to -- Application as Filed for U.S. Appl. No. 11/544,252, filed Oct. 7, --

On Page 3, Column 1, Line 51, please change "LC/MS," Global View Publishing, pp. 64-64, 470-471, Copyright" to -- LC/MS," Global View Publishing, pp. 64-65, 470-471, Copyright --

On Page 3, Column 2, Line 1, please change "Lee T. D., et al., "An EHD Sources for the Mass Spectral Analysis of" to -- Lee, T. D, et al., "An EHD Source for the Mass Spectral Analysis of" --

This certificate supersedes the Certificate of Correction issued November 3, 2009.

Signed and Sealed this

Twelfth Day of January, 2010

David J. Kappos

David J. Kappos
*Director of the United States Patent and Trademark Office*